US006669217B2

(12) United States Patent  (10) Patent No.: US 6,669,217 B2
Sorum et al.                (45) Date of Patent:    Dec. 30, 2003

(54) ANTI-ROLL SUSPENSION VALVE BODY

(75) Inventors: Robert D. Sorum, Caledonia, MI (US); Curtis A. Trudeau, Caledonia, MI (US); Gary L. Schafer, Shelbyville, MI (US); Dick E. Winter, Kentwood, MI (US)

(73) Assignee: Hadley Products, Grandville, MI (US)

( * ) Notice: Subject to any disclaimer, the term of this patent is extended or adjusted under 35 U.S.C. 154(b) by 0 days.

(21) Appl. No.: 09/859,548

(22) Filed: May 17, 2001

(65) Prior Publication Data

US 2002/0171219 A1 Nov. 21, 2002

(51) Int. Cl.[7] .............................................. B60G 11/30
(52) U.S. Cl. ...................... 280/124.16; 280/124.158; 280/124.159
(58) Field of Search ...................... 280/124.16, 124.157, 280/124.158, 124.159

(56) References Cited

U.S. PATENT DOCUMENTS

| 2,184,202 | A |   | 12/1939 | Tschanz |           |
|-----------|---|---|---------|---------|-----------|
| 2,633,811 | A |   | 4/1953  | Poage   |           |
| 2,784,978 | A |   | 3/1957  | Seale   |           |
| 3,810,650 | A |   | 5/1974  | Hudson  |           |
| 3,836,161 | A |   | 9/1974  | Buhl    |           |
| 3,917,307 | A |   | 11/1975 | Shoebridge |        |
| 4,279,319 | A | * | 7/1981  | Joyce, Jr. ..................... 180/12 |
| 4,641,843 | A |   | 2/1987  | Morrisroe, Jr. |   |
| 4,733,876 | A |   | 3/1988  | Heider et al. |    |
| 4,923,210 | A |   | 5/1990  | Heider et al. |    |
| 4,966,390 | A |   | 10/1990 | Lund et al. |      |
| 5,040,823 | A |   | 8/1991  | Lund |             |
| 5,161,579 | A |   | 11/1992 | Anderson, Jr. |   |
| 5,342,080 | A | * | 8/1994  | Machida ..................... 280/6.15 |
| 5,344,189 | A | * | 9/1994  | Tanaka et al. ........... 280/6.152 |
| 5,449,194 | A | * | 9/1995  | Wernimont et al. ...... 280/6.153 |
| 5,560,591 | A |   | 10/1996 | Trudeau et al. |   |
| 5,623,410 | A | * | 4/1997  | Furihata et al. ................ 701/37 |
| 5,865,453 | A | * | 2/1999  | Harada et al. ......... 280/124.161 |
| 6,098,996 | A |   | 8/2000  | Perlot |           |
| 6,189,903 | B1 | * | 2/2001 | Bloxham ................ 280/124.16 |
| 6,240,348 | B1 | * | 5/2001 | Shono et al. ................... 701/37 |
| 6,308,973 | B1 | * | 10/2001 | Griebel et al. ........ 280/124.159 |
| 6,416,061 | B1 | * | 7/2002 | French et al. ............. 280/5.514 |
| 6,428,024 | B1 | * | 8/2002 | Heyring et al. ....... 280/124.106 |

FOREIGN PATENT DOCUMENTS

EP          0208572      6/1986
GB          1582333      1/1981

* cited by examiner

*Primary Examiner*—Paul N. Dickson
*Assistant Examiner*—Toan C To
(74) *Attorney, Agent, or Firm*—Warner Norcross & Judd LLP

(57) ABSTRACT

A suspension system that restricts side-to-side airflow between air springs on opposite sides of a vehicle or trailer. In one embodiment, active airflow discs in suspension ports of a valve operate in two modes; restrictive and non-restrictive. A disc attains a non-restrictive mode when air is exhausted from an air spring. A disc attains a restrictive mode when air is injected into the suspension port from the valve toward an air spring. Airflow discs in opposing suspension ports both attain a non-restrictive state to rapidly dump air from the springs and lower vehicle ride height. In another embodiment, a pneumatic circuit includes one-way check valves, in fluid communication with opposing air springs, aligned to restrict airflow between the opposing springs under uneven loading conditions. A pair of electronic solenoids acts in concert with the check valves to selectively inflate or deflate the air springs.

28 Claims, 9 Drawing Sheets

ANTI-ROLL SUSPENSION VALVE BODY

BACKGROUND OF THE INVENTION

The present invention relates to a leveling system for a vehicle, and more particularly to a valve body for distributing air to suspension elements.

Conventional leveling systems are installed in a wide variety of vehicles ranging from passenger cars to semi-trucks and semi-trailers. The larger leveling systems typically include pneumatic suspension elements, such as shocks or air springs, that can be inflated or deflated to control the height of the frame with respect to the axle. For example, on semi-trailers, heavy loads can cause a suspension to sag, thereby decreasing the distance between the frame and the axle. Accordingly, the ride height of the trailer, that is, the distance between the trailer bed and the ground, may be reduced. In conventional leveling systems, the ride height of the trailer may be adjusted by inflating or deflating the pneumatic suspension to compensate for the load. Specifically, when the ride height of a trailer has been affected by a heavy or light load, the suspension elements can be inflated or deflated to return the trailer to the desired ride height.

In leveling systems of the prior art, the height of the suspension is controlled by mechanical height control valves including a valve assembly and a valve body. The valve assembly senses the fluctuations in the ride height due to loading and controls the inflation/deflation of the suspension elements through the valve body. Typically, the valve body is located within the leveling circuit between a source of compressed air and the suspension elements. During operation, the valve body typically is in a neutral or "closed" mode. Accordingly, air cannot enter or leave the leveling circuit. However, due to fluid communication between suspension elements on opposite sides of the vehicle via the valve body, air may flow from a left side element to a right side element when the left side element is excessively loaded-this is called "side-to-side" air transfer. Obviously, air may flow from right to left when the right side is excessively loaded as well.

Illustrated in FIG. 1 is an uneven loading situation resulting in side-to-side air transfer. A vehicle 110 traversing a corner has a tendency to tilt or roll outward away from the "center" of the corner, due to centrifical force. During this tilting action, the right side elements 104 are excessively compressed by the load being shifted outward. Due to the fluid communication between the left 102 and right 104 side suspension elements, air is forced from right side suspension elements 104, travels through the valve body 108, and into the left side suspension elements 102. As a consequence, the left side suspension elements 102 extend and exacerbate the tilt or roll of the vehicle. Further, given the advent of larger airflow lines used in conventional leveling circuits to promote quicker inflation/deflation of air suspension elements, side-to-side air transfer is substantially increased.

Illustrated in FIG. 2 is a valve body 115 of the prior art that attempts to correct side-to-side transfer of air by placing a passive restrictive element 112 within the valve body 115. Although the use of the restrictive element does limit the side-to-side transfer of air A during cornering, it creates a variety of problems. First, the restrictive element restricts (a) dumping of air from the suspension elements, through the dump port 122 during deflation, and (b) injection of air into the valve body 115 via the supply port 126, and consequently into the suspension elements, during inflation. Second, dirt or debris accidentally entering the interior portion of the valve body, may become lodged between the restrictive element and the valve body to substantially impede airflow through the valve body. Moreover, to remove the debris, the valve body must be detached from the valve assembly.

SUMMARY OF THE INVENTION

The aforementioned problems are overcome by the present invention wherein the valve body of a height control leveling system is provided with devices to actively restrict side-to-side transfer of air between suspension elements.

In one embodiment, a restrictive airflow disc is positioned in each of the two suspension ports of a valve body to actively restrict side-to-side air transfer. The airflow disc is a thin, flat circular plate with an orifice through its center, and bypass orifices disposed around the disc's circumference. A coil spring is attached to a first side of the disc, and a sealing element is disposed around the central orifice on a second side of the disc. In each of the suspension ports, the coil spring abuts an internal seat of the valve body and forces the sealing element in sealing engagement with a suspension fitting associated with the air supply line coupled to the suspension port.

The disc has two modes; restrictive and non-restrictive. The disc attains a non-restrictive mode when air, forcibly exhausted from an air spring, presses against the disc and compresses the coil spring. The compression of the spring causes the disc to move away from the suspension fitting, and disengages the sealing element from the suspension fitting, thereby allowing air to exhaust into the valve body through the bypass orifices as well as the central orifice. The disc attains a restrictive mode when air is injected into the suspension port from the valve body. The sealing engagement of the sealing element against the suspension fitting is reinforced so that air enters the suspension lines through the central orifice alone. Thus, when air is forced from a compressed suspension element during cornering to the valve body through a suspension port, the airflow disc associated with the suspension port connected to the compressed element attains a non-restrictive state; and air flows freely into the valve body. Conversely, when air passes through the valve body into the suspension port associated with the suspension element on the opposing, unloaded side of the vehicle, the airflow causes the airflow disc in that suspension port to substantially obstruct the suspension port, so that air cannot pass freely to the unloaded suspension port. Thus, at least for short periods of time, tilting or rolling is not exacerbated by side-to-side air transfer.

In another aspect of the invention, both airflow discs attain a nonrestrictive state to promote rapid dumping of air simultaneously from the suspension elements to lower the ride height of the vehicle.

In a third aspect of the present invention, the airflow discs are easily installed and maintained in conventional valve bodies. The airflow discs are disposed within the suspension ports between an internal seat of the valve body and an external fitting associated with an air supply line leading to the suspension elements.

In a second embodiment of the invention, a system or pneumatic circuit of solenoids and one-way valves actively restrict side-to-side air transfer. Suspension elements on opposite sides of a vehicle, a supply port and dump port are plumbed into a system including solenoids and multiple check valves. A first solenoid may be selectively actuated (a) to allow air into the suspension elements through the supply port or (b) to prevent air from escaping the system through the supply port. A second solenoid may be selectively actuated (a) to dump air from the suspension elements through the exhaust port or (b) to prevent air from escaping the system through the exhaust port.

In this second embodiment, the check valves are oriented in the system so that when suspension elements on one side of the vehicle exhaust air therefrom, such as during cornering, that air is restricted by the check valves and will not rapidly transfer through the system to the suspension elements on the other side. The solenoids act in concert with the check valves to restrict side-to-side transfer, and prevent air from being lost or input into the system during side-to-side transfer and under even-load conditions.

The check valves also act in concert with the solenoids to supply air to or dump air from the suspension elements. For example, when dumping air from the suspension elements, some of the check valves attain a non-restricting state and act in concert with the exhaust solenoid to allow air to dump from the system. Similarly, when supplying air to the suspension elements, different check valves attain a non-restricting state and act in concert with the supply solenoid to allow air to enter the system and fill the suspension elements.

These and other objects, advantages, and features of the invention will be readily understood and appreciated by reference to the detailed description of the preferred embodiment and the drawings.

DETAILED DESCRIPTION OF THE DRAWINGS

DETAILED DESCRIPTION OF THE PREFERRED EMBODIMENT

Figure 1:
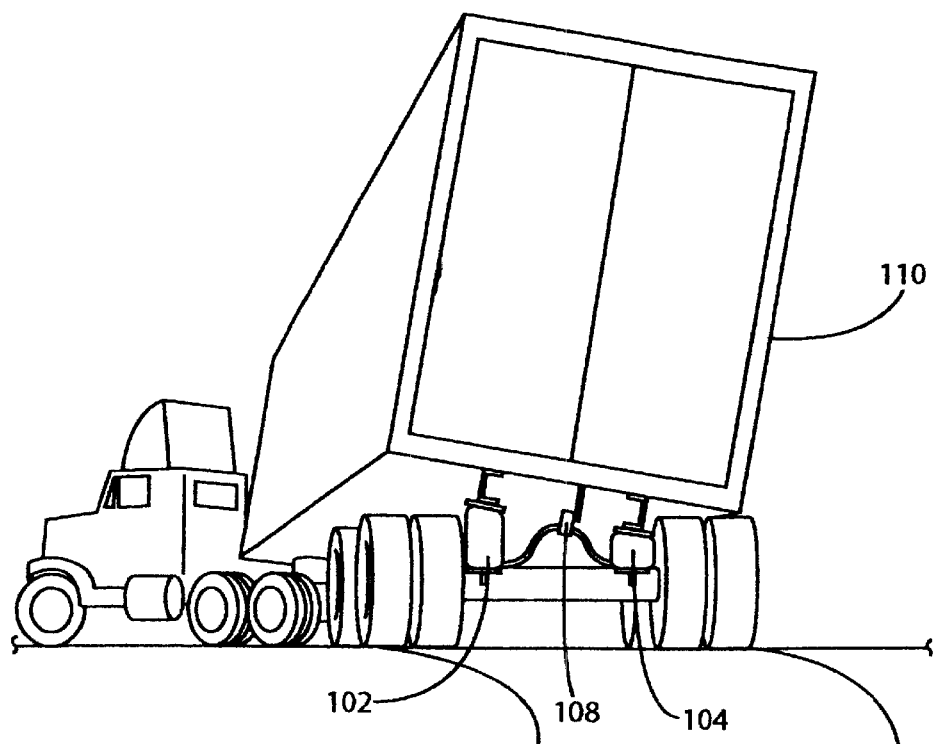
FIG. 1 is a perspective view of a vehicle suspension system during cornering.
Figure 2:
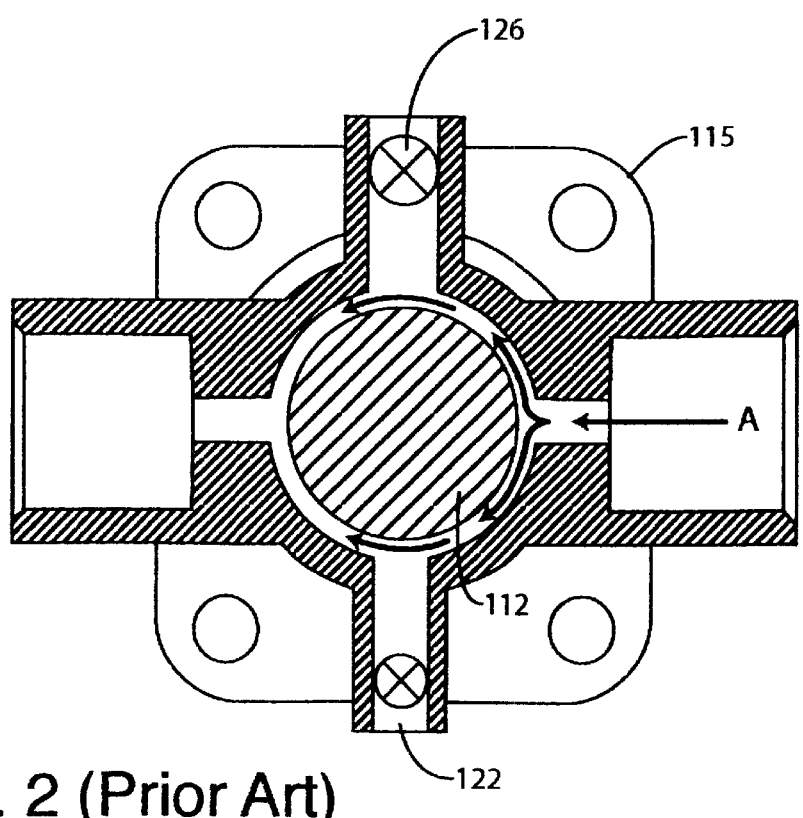
FIG. 2 is a sectional view of the prior art valve body with a restrictive body therein.

A valve body according to a first embodiment of the present invention is illustrated in FIGS. 3, 4 and 7–10 and generally designated 10. For purposes of disclosure, the valve body 10 is described in connection with a conventional leveling system where the valve mechanism 30 couples to valve body 10 where the valve mechanism functions to control the flow of air into and out of the suspension elements 42, 44 through valve body 10 (see FIG. 3). The valve body is well suited for use in a variety of other leveling systems besides suspension, such as conventional truck cab leveling systems designed to level the truck cab with respect to the truck frame.

The leveling system of the present invention generally includes valve body 10 coupled to a valve mechanism 30 including an actuator yoke 33. The valve mechanism 30 is mounted to the vehicle frame 40 in a conventional manner and connected to the axle 46 or any other part suspension via actuator yoke 33. The actuator yoke 33 may be mounted to virtually any element that moves with the axle or to any portion of a suspension. Also, the valve mechanism 30 may be installed in reverse with a valve body secured to the axle (or other suspension-related element). In other applications, such as a truck cab leveling system, the height control valve mechanism is mounted between the two components for which relative movement is to be controlled.

Figure 4:
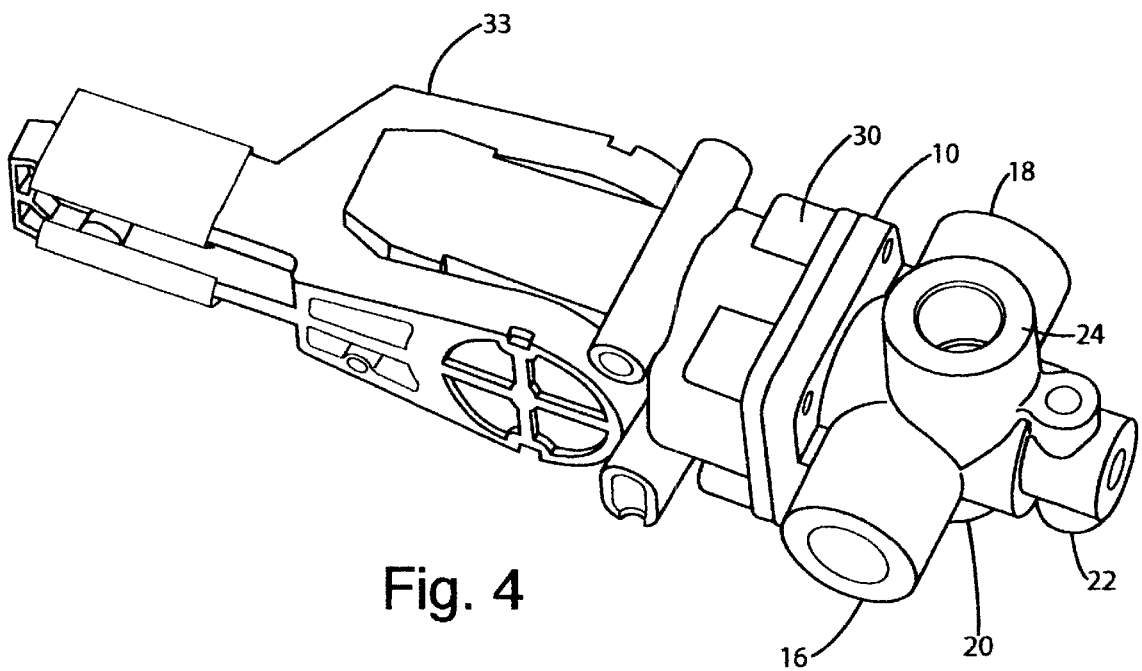
FIG. 4 is a perspective view of the valve body.
Figure 7:
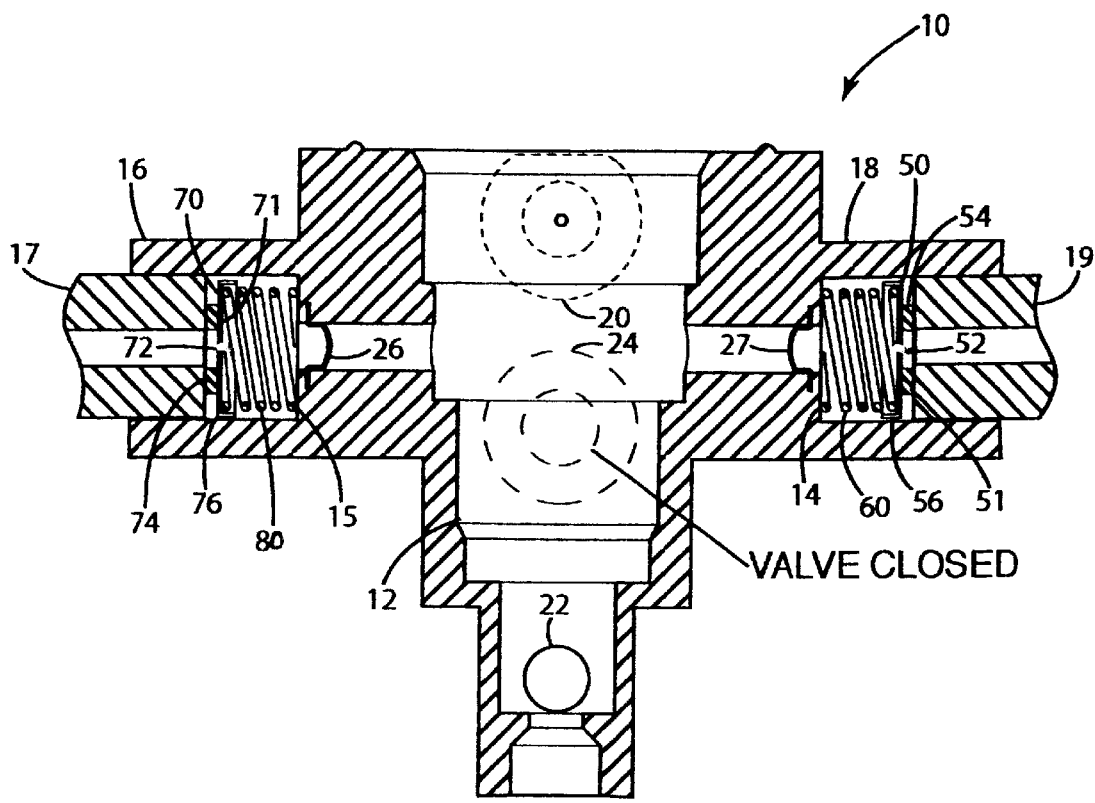
FIG. 7 is a sectional view of a valve body with airflow discs when suspension elements are in equilibrium.

With reference to FIGS. 4 and 7, part of the valve mechanism 30 (not shown) extends into the internal bore 12 of valve body 10. As will be appreciated by those skilled in the art, the valve mechanism controls the supply of air through the supply port 24 into the suspension ports 16 and 18 as well as exhaust and dumping of air from the suspension ports 16 and 18 through dumping port 20 and exhaust port 22. For the sake of simplicity, the valve mechanism within the internal bore 12 responsible for controlling the supply, dumping and exhaust of air through the valve body 10 has been omitted in FIGS. 7–10. To indicate open and closed valves associated with the supply port and exhaust port, "Valve Open" and "Valve Closed" is indicated in FIGS. 7–10. As will be appreciated by those skilled in the art, the actual opening and closing of valves associated with these ports is controlled by the omitted valve mechanism.

Figure 3:
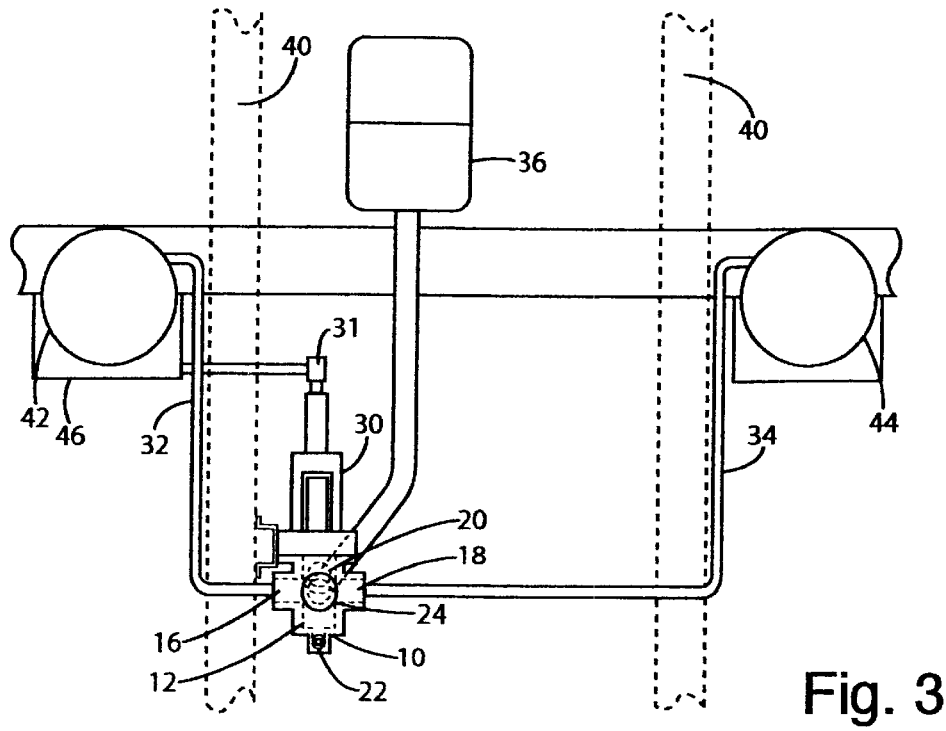
FIG. 3 is a plan view of the leveling system of the present invention.

As depicted in FIGS. 3 and 7, the valve body 10 includes suspension ports 16 and 18 which are connected to the suspension elements 42 and 44 via air lines 32 and 34. Conventional suspension fittings or air line fittings 17 and 19 are used suspension ports 16 and 18. As will be appreciated by those skilled in the art, fittings may include threaded fittings, snap-fit fittings, permanently connected fittings, and other types of fittings. The fittings 17 and 19 are further connected to the air line 32 and 34, respectively, as depicted in FIG. 3. Accordingly, suspension elements 44 and 42 are in fluid communication with one another through the valve body 10. Screens 26 and 27 may optionally be positioned in each of the suspension ports to prevent debris from entering the internal bore 12 of the valve body. These screens may be of any type or material as will be appreciated by those skilled in the art. Each of the suspension ports 16 and 18 include internal seats 14 and 15. As depicted in FIGS. 7–10, the internal seats are generally reductions in the diameter of the bore of each suspension port 16 and 18; however, "internal seat" also includes any type of protrusion into the bore of the suspension port. The valve body 10 is made out of plastic so that it is resistant to corrosion. The valve body also may be made of metal or alloys as desired. The valve body of the present invention may be used in conjunction with multiple suspension elements associated with multiple axles of a vehicle as will be appreciated by those skilled in the art. The spring elements 60, 80 of the airflow disc, 50, 70 seat against the internal seats 14 and 15 of the valve body 10. On the opposite faces of the disc plates 51, 71, sealing elements 54, 74 seal the airflow discs 50, 70 against the fittings 19 and 17.

Figure 5:
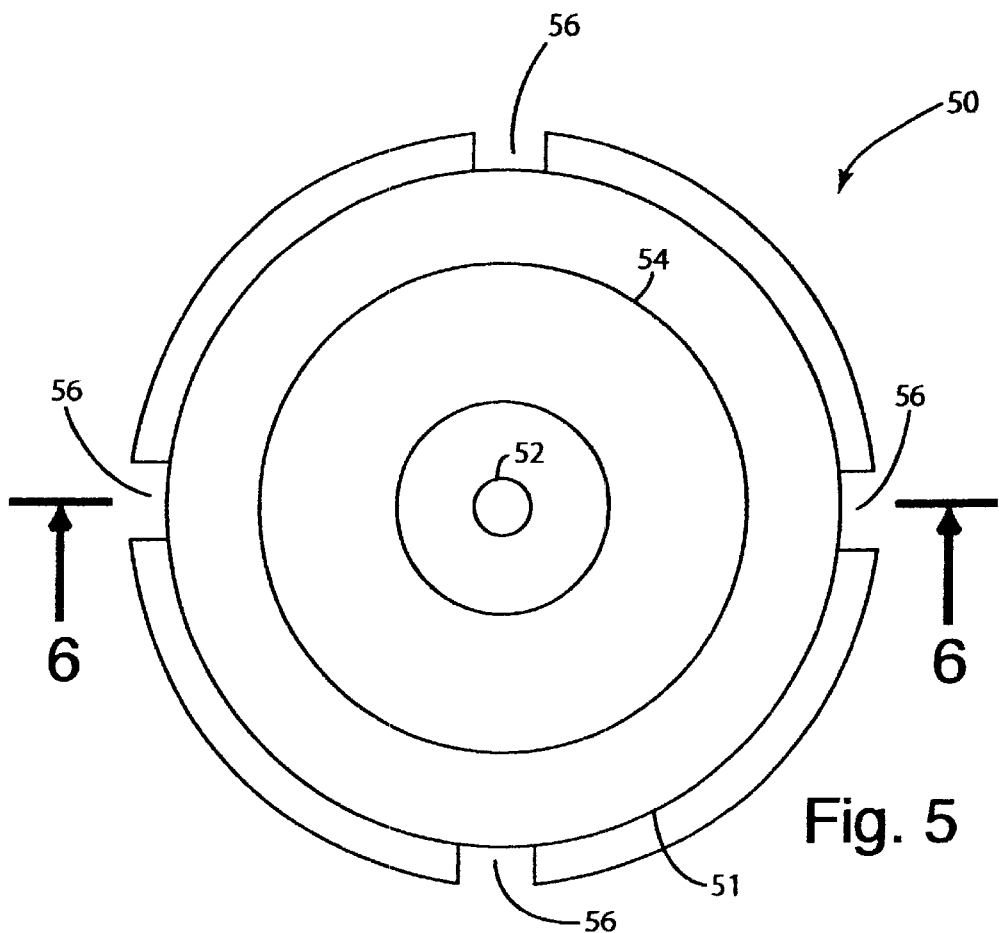
FIG. 5 is a top plan view of an airflow disc of one embodiment.
Figure 6:
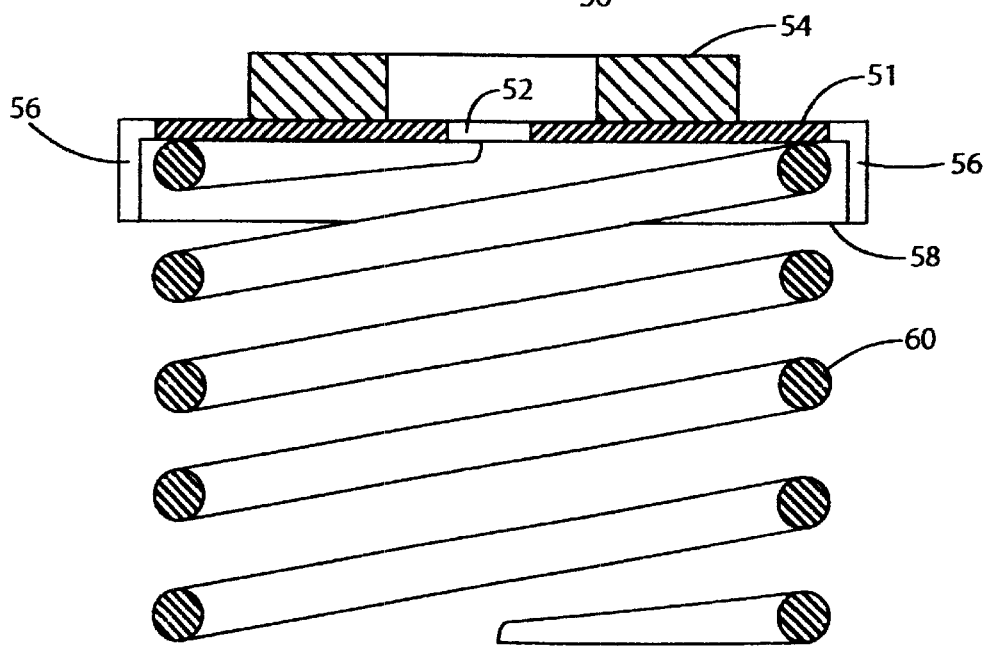
FIG. 6 is a sectional view of the airflow disc taken along lines 6—6 of FIG. 5.
Figure 11:
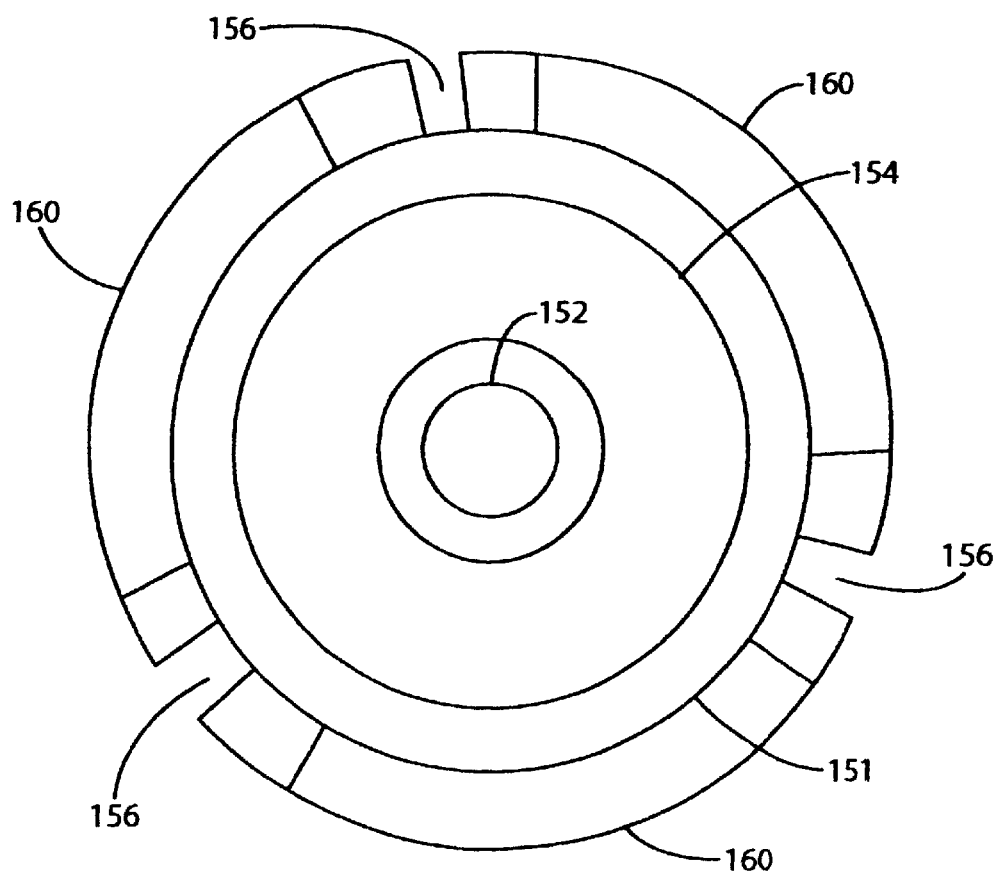
FIG. 11 is a top plan view of an alternative embodiment of the airflow disc.
Figure 12:
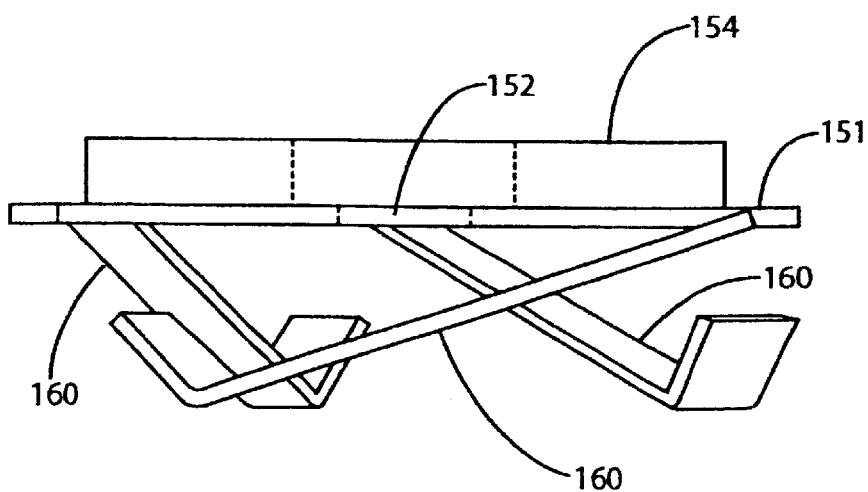
FIG. 12 is a side of view of an alternative embodiment of the airflow disc.

As depicted in FIGS. 5 and 6, a first embodiment of the airflow disc includes disc plate 51 and an orifice 52 defined by the approximate center of the disc plate 51. The orifice is any hole of any size or shape, depending on the desired air flow defined by the plate 51. Disposed concentrically around the orifice 52 is sealing element 54. A "sealing element" includes washers, o-rings, gaskets, integrated seals, or any other seals, made from rubber, plastic, silicone, cork, or any other suitable material. Around the periphery of the disc plate 51 are bypass orifices 56. These orifices may be of any number or size or configuration depending on the desired flow of air that is bypassed. On the side of the disc plate 51 opposite the sealing element 54 and contained by the spring guide flange 58 is spring element 60. The spring element may be a helical coil as depicted in FIG. 6, or any other configuration, including that depicted in FIGS. 11 and 12 of a second embodiment for an airflow disc where the spring elements are leaf prongs 160 disposed around the outer circumference of the airflow disc plate 151. Depending on the desired airflow, the spring element 60 of the preferred embodiment may be of a predetermined elasticity. The airflow disc 50 and all components thereof are preferably manufactured using corrosion resistant materials such as engineered polymers or elastomers.

Operation

The operation of the valve body of the present invention to prevent side-to-side air transfer while still providing rapid deflation of the suspension elements will now be described.

FIG. 7 illustrates the valve body of the preferred embodiment when the suspension elements are evenly loaded and thus in equilibrium. The airflow discs 50 and 70 are disposed in each of the suspension ports 18 and 16 so that the sealing elements 54, 74 abut against the fittings 19 and 17 within the suspension ports. The sealing elements 54, 74 abut the fittings 19 and 17 to provide sealing engagement between the fittings 19 and 17 and the airflow disc plates 51 and 71 respectively. The spring elements 60, 80 bias the disc plates 51 and 71 to reinforce sealing engagement of the sealing elements 54, 74 between the disc plates 51 and 71 and fittings 19 and 17. Because valves associated with the supply port 24 and exhaust port 22 are closed, the system is in equilibrium. Accordingly, air is not transferred through the suspension ports 16 and/or 18 into or out from the internal bore 12, the airflow discs 50 and 70 remain abutting fittings 19 and 17.

Figure 8:
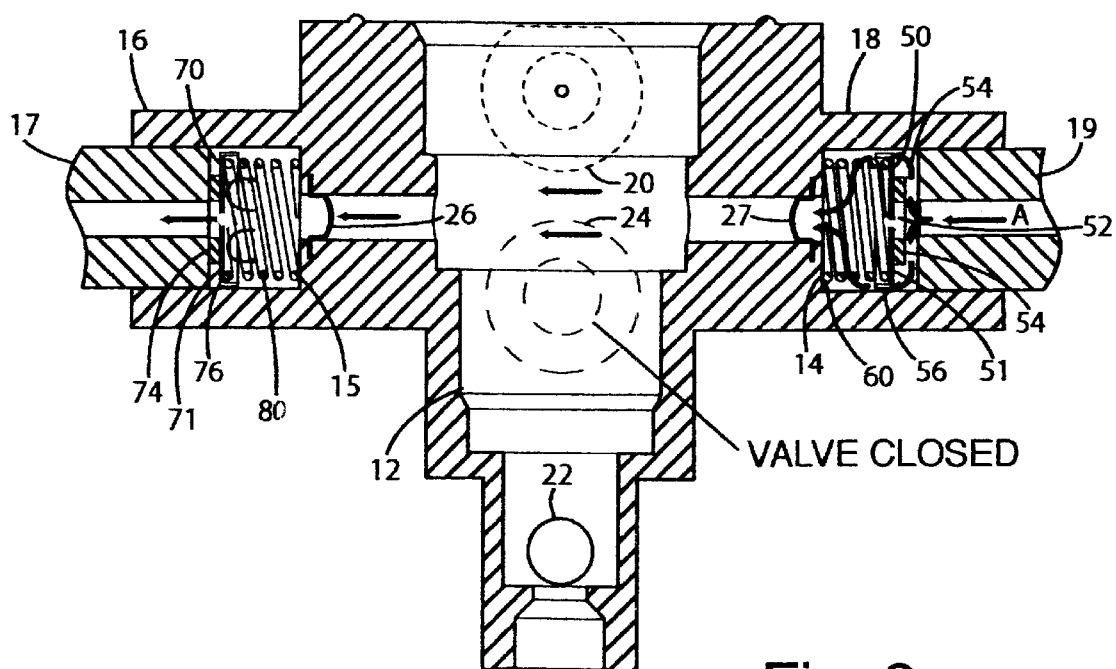
FIG. 8 is a sectional view of the valve body with airflow discs when the suspension elements are unevenly loaded.

FIG. 8 illustrates the airflow discs actively restricting side-to-side air transfer. As discussed above, and illustrated in FIG. 1, when a vehicle traverses a corner, the vehicle will tilt and, accordingly, unevenly load suspension elements on opposite sides of the vehicle. For example, the suspension element on the outside of a corner will be compressed thus exhausting the air from that suspension element through the suspension port the valve body. When air, depicted in FIG. 8 as A, flows through the fitting 19, it forcefully pushes against the disc plate 51. The spring element 60 thus is compressed and the disc plate 51 is forced away from the fitting 19 whereby air A flows through the central orifice 52, as well as around the bypass orifices 56 into the internal bore 12. Accordingly, the flow of air from the suspension port is increased over that which it would be if air flowed through the central orifice alone.

Because the dump port 20, supply port 24 and exhaust port 22 are closed, air cannot escape the internal bore 12 via the exhaust port 22 or the supply port 24. Thus, the internal pressure of the internal bore 12 raises and forces the airflow toward the opposing suspension port 16. As the air contacts the airflow disc in the left side suspension port 16, the air forces the airflow disc 71 against the fitting 17 in the suspension port 16. Accordingly, the sealing element 74 is pushed in further sealing engagement against the fitting 17. Consequently, the air within the internal bore 12 may only pass through central orifice 72 of the disc plate 71; no air flows around bypass orifices 76. Notably, after extended periods of time, air passes through the central orifice and the suspension element on the "unloaded" side of the vehicle eventually fills with air.

Figure 9:
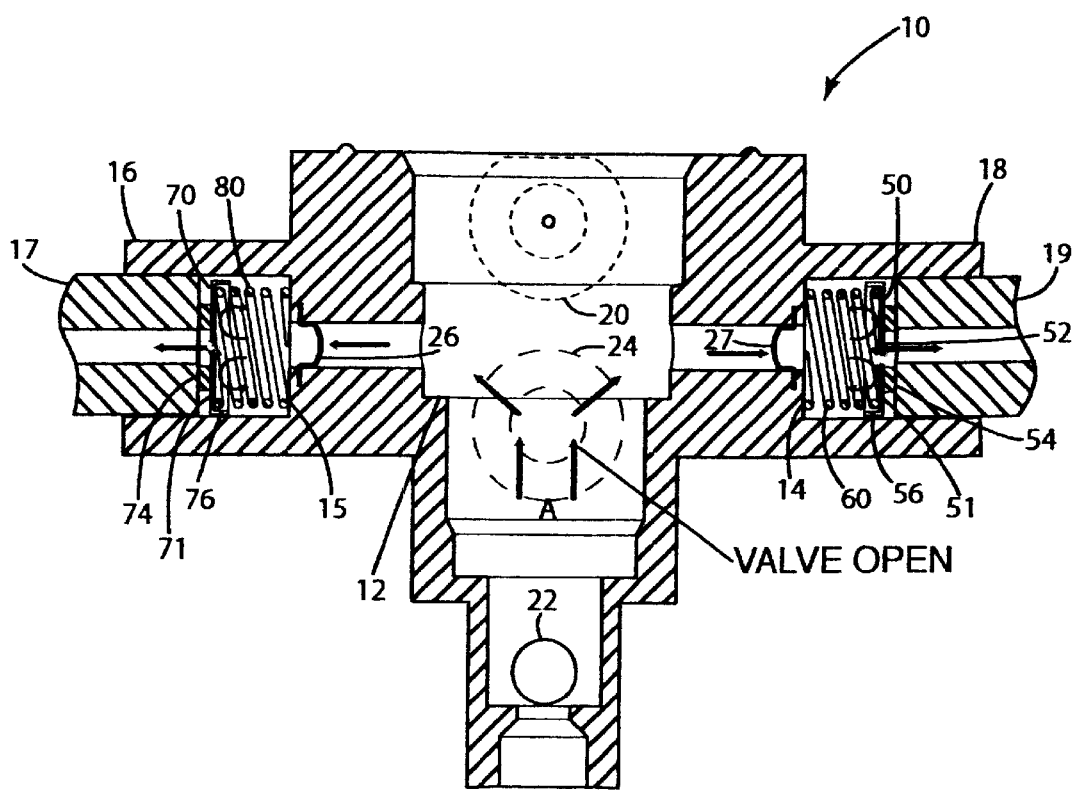
FIG. 9 is a sectional view of the valve body with airflow discs while inflating the suspension elements.

The valve body of the present invention also provides for inflation of suspension elements on opposing sides of the vehicle to raise the ride height of the vehicle. As depicted in FIG. 9, air A from an air supply (not shown), is forced under pressure into supply port 24, as will be appreciated by those skilled in the art. The air enters the internal bore 12 of the valve body 10. Because the valve (not shown) associated with exhaust port 22 is closed, air is prevented from escaping internal bore 12 therethrough. Once air enters into the internal bore 12, it is dispensed into the suspension ports 16 and 18. Because of the increased internal pressure, the air pushes the airflow discs 50 and 70 into sealing engagement with the fittings 17 and 19. Accordingly, air enters the fittings 17, 19, that are in fluid communication with the suspension elements on opposing sides of the vehicle (not shown) through internal orifices 52 and 72.

Figure 10:
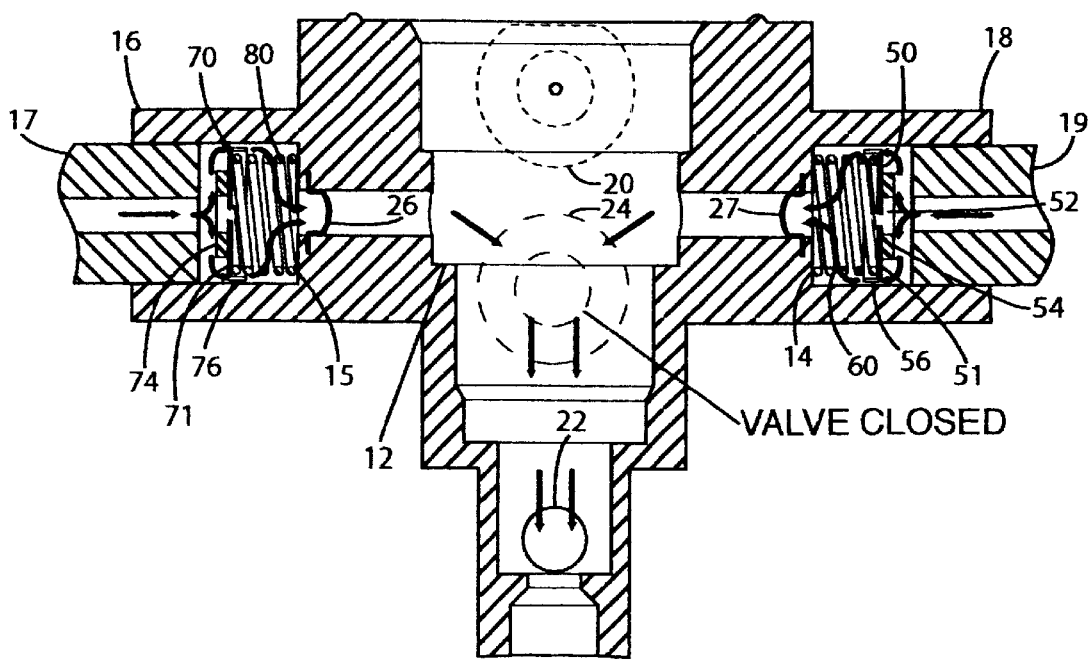
FIG. 10 is a sectional view of the valve body with airflow discs while dumping the suspension elements.

The valve body of the present invention also provides for rapid dumping of air from opposing suspension elements of a vehicle to lower the ride height of the vehicle. FIG. 10 depicts the valve body and associated airflow discs 50 and 70 while simultaneously dumping air from suspension elements on opposing sides of a vehicle. To initiate dumping, the dump port 20 is pressurized by actuation of the valve mechanism within the internal bore 12, as will be appreciated by those skilled in the art. The supply port 24 and dump port 20 remain closed during dumping. Once the valve (not shown) is opened, air exits the suspension elements through the suspension ports 16 and 18. Air exiting through the fittings 17 and 19 forcibly pushes against the disc plates 51 and 71. Accordingly, the airflow discs 50 and 70 are pushed inward, thus compressing spring elements 60 and 80 simultaneously. With the spring elements compressed, the air from the suspension ports 16 and 18 may flow through bypass orifices 56 and 76 freely into the internal bore 12 and out through the exhaust port 22. In this manner, the air flow is substantially unrestricted so that the air may be dumped from the suspension elements rapidly.

Alternative Embodiments

The airflow discs of the present invention may be used in conjunction with a dual suspension port valve body and alternatively with a single suspension port valve body. In the single suspension port application, a modification of the preferred embodiment is required. A T-type connector is attached to the single suspension port to provide fluid communication between that suspension port and suspension elements on opposite sides of the vehicle. For example, one part of the T connects to the single suspension port of the valve body, one part of the T connects to the left side suspension elements, and the third and last part of the T connects to the right side suspension ports. Like the preferred embodiment, airflow discs are disposed opposedly within the T-connector ports associated with the suspension elements in a fashion similar to that in the first embodiment side-to-side air transfer is restricted in the same manner as in the first embodiment.

In a second, third and fourth embodiments of the present invention, a system or pneumatic circuit of one-way valves and solenoids restrict side-to-side transfer of air between opposing suspension elements and additionally allows adequate supply and dumping of air from those elements. Generally, in these three embodiments, depicted in FIGS. 13–15, right side suspension element 242 and left side element 244 are in fluid communication with conventional air supply reservoir 200 and conventional dump port 222 via: valve system 210 in the first alternative embodiment depicted in FIG. 13; valve system 310 of the second alternative embodiment depicted in FIG. 14; and valve system 410 of the third alternative embodiment depicted in FIG. 15. Although only two suspension elements are depicted, any number of suspension elements on opposite sides of a vehicle or trailer may be plumbed into the system. The air reservoir 200 may be plumbed into any air supply device, such as a compressor. The dump port may be any commercially available air outlet, which may or may not be restricted.

Figure 13:
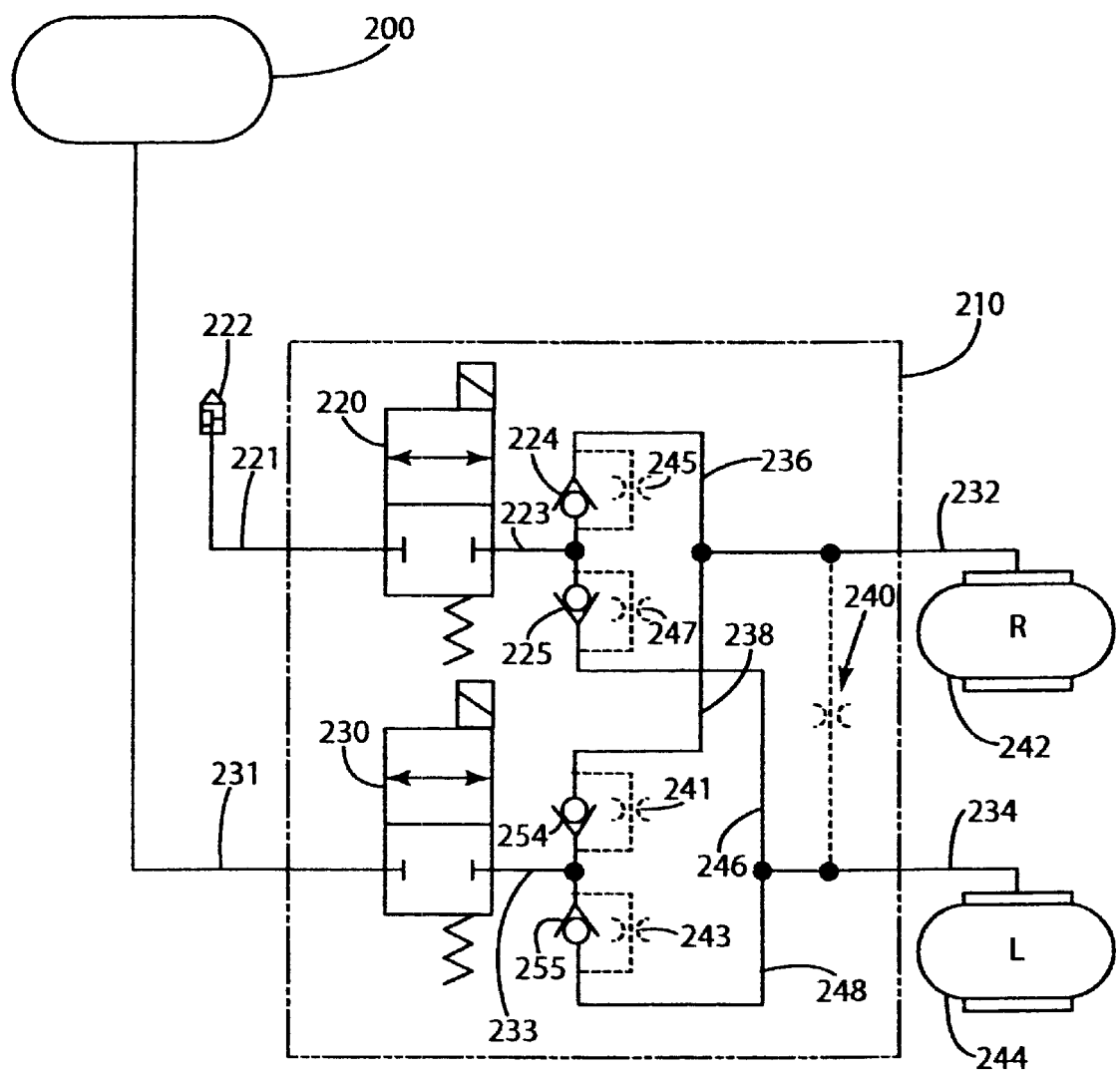
FIG. 13 is a schematic view of a second alternative embodiment of the leveling system incorporating a system of one-way valves and solenoids.

More particularly, with reference to the second alternative embodiment of FIG. 13, suspension elements 242 and 244 are in fluid communication with valve system 210 via suspension lines 232 and 234. Suspension line 232 provides fluid communication between suspension element 242, preferably a right side suspension element or elements, and intermediate dump line 236 and intermediate supply line 238.

Intermediate right dump line 236 includes one-way valve 224, which preferably is a check valve, but may be any one-way valve that restricts or prevents flow in one direction and allows free flow in an opposite direction. As used herein "prevent," when used with reference to a one-way valve preventing fluid or air flow, means to stop air from passing by the one-way valve to the extent it is feasible with conventional valves. In some cases, such as with a ball-bearing check valve, a minute amount of air may flow between the bearing and the internal surface of the valve, even when the bearing is in its restricting state. In this case, the valve is still considered prevented by the valve. One-way valve 224 is oriented to allow air to flow unrestricted from intermediate right dump line 236 to dump solenoid line 223, but restrict or prevent air from flowing from the dump solenoid line 223 back into intermediate right dump line 236. Preferably, the one-way valves used herein restrict airflow sufficiently so that no air passes through those valves.

Intermediate right supply line 238 includes one-way valve 254, which preferably is a check valve, but may be any one-way valve that restricts or prevents flow in one direction and allows relatively free flow in an opposite direction. One-way valve 254 is oriented to allow air to flow unrestricted from solenoid line 233 to intermediate right supply line 238 but restrict or prevent air from flowing from the intermediate right supply line back into right solenoid supply line 238.

As can be seen in FIG. 13, suspension line 234 provides fluid communication between suspension element 244, preferably a left side suspension element or elements, and intermediate left dump line 246 and intermediate left supply line 248. Intermediate left dump line 246 includes one-way valve 225, which preferably is a check valve, but may be any one-way valve that restricts or prevents flow in one direction and allows relatively free flow in an opposite direction.

One-way valve 225 is oriented to allow air to flow unrestricted from intermediate left dump line 246 to dump solenoid line 223, but restricts or prevents air from flowing from the dump solenoid line 223 back into intermediate left dump line 246.

Dump solenoid line 223 is in fluid communication with intermediate left and right dump lines 236 and 246, and dump solenoid 220. The dump solenoid is preferably an electronic solenoid that may be actuated by an operator, such as a computer or human operator, to selectively allow air to pass freely from solenoid dump line 223 to dump line 221 and out dump port 222. Air flowing from the suspension elements through the valve system out the dump port, is referred to as "dumping" or "deflating." As will be appreciated, any type of electronic or selectively actuatable valves may be substituted for the solenoids of the present invention.

Intermediate left supply line 248 includes one-way valve 255, which preferably is a check valve, but may be any one-way valve that restricts or prevents flow in one direction and allows relatively free flow in an opposite direction. One-way valve 255 is oriented to allow air to flow unrestricted from supply solenoid line 233 to intermediate right supply line 248 but restrict or prevent air from flowing from the intermediate right supply line 248 into solenoid supply line 233.

Supply solenoid line 233 is in fluid communication with intermediate left and right supply lines 238 and 248, and supply solenoid 230. The supply solenoid is preferably an electronic solenoid that may be actuated by an operator, such as a computer or human operator, to selectively allow air to pass freely from air supply line 231 through the solenoid 230, through the solenoid supply line 233 and into right and left intermediate supply lines 238 and 248 respectively. Air flowing into the suspension elements through the valve system is referred to as "filling" or "inflating."

With reference to FIG. 13, the left 244 and right 242 suspension elements are preferably in restricted fluid communication via a relief system, several options of which are shown in dotted lines. This relief system allows air to exhaust air from one side of suspension elements to the other should the suspension elements of one side become excessively loaded. The use of one of this relief systems prevents damage, and in some cases rupture of excessively loaded suspension elements by transferring air from those elements to others. Preferably, the relief system includes a line including an orifice of a pre-selected diameter therein to selectively restrict flow of air through the line. Any type of restricting device may be used. Optionally, the lines may themselves be of a pre-selected diameter to restrict flow.

In a first option, an orifice line 240 provides fluid communication between suspension lines 232 and 234. In a second option, bypass dump-side orifice lines 245 and 247 bypass one-way valves 224 and 225 to allow restricted fluid communication between intermediate right 236 and left 246 dump lines, and consequently restricted fluid communication between suspension lines 232 and 234. In a third option, bypass supply-side orifice lines 241 and 243 bypass one-way valves 254 and 255 to allow restricted fluid communication between intermediate right 238 and left 248 supply lines, and consequently restricted fluid communication between suspension lines 232 and 234. Preferably, the orifices of the orifice lines of the present invention include internal diameters that are about 0.001 to about 0.25 inches, more preferably about 0.01 to about 0.09 inches, and most preferably about 0.030 inches. Optionally, the orifices may be of any dimension or shape with an area of 0.00001 square inches to 0.25 square inches.

In operation, the second alternative embodiment: (1) prevents completely unrestricted side-to-side air transfer in suspension elements of a vehicle or trailer; for example, from element 242 to element 244 or vice versa; (2) rapidly fills the suspension elements to increase ride height; and (3) rapidly dumps air from the suspension elements to lower ride height. Under normal conditions, when the suspension elements and are under equal loads, the system is static, that is, fluid is neither being input into the system or exiting from the system.

During cornering, one side of the vehicle is under a greater load due to tilt of the vehicle. Accordingly, one set of suspension elements is loaded more and naturally attempts to expel air therefrom. For example, during a hard left turn, right suspension element 242 is subjected to a loading force, and compensates by expelling air therefrom. With reference to FIG. 13, if suspension element 242 expels air into suspension line 232, that air travels unrestricted into two other lines; intermediate right dump line 236 and intermediate right supply line 238. Preferably, dump solenoid 220 and supply solenoid 230 are not actuated and thus closed during operation of the vehicle to prevent air from being dumped or input into the valve system. With the configuration of the one-way valves in these two lines, air cannot be transferred directly, that is, unrestricted, through the intermediate right dump line 236 to the intermediate right supply line 238 or any other line associated with the left side suspension elements. Thus, side-to-side air transfer is restricted. Similar restriction of side-to-side transfer occurs when the vehicle corners to the right and air attempts to rapidly expel from the left suspension elements 244.

Notably, a small amount of air is transferred in restricted flow from the right suspension line 232 to the left suspension line via orifice line 240, bypass dump-side orifice lines 245 and 247, and/or bypass supply-side orifice lines 241 and 243, depending on which of these options is implemented in the valve system 210. Because these orifice lines are so restricting, a substantial amount of air cannot rapidly pass from the right suspension elements to the left suspension elements and exacerbate tilt or roll of the vehicle.

To inflate the suspension elements with air, for example to increase the ride height of the vehicle, supply solenoid 230 is activated, and consequently air passes from reservoir 200, through supply line 231 and into solenoid supply line 233. Because one-way valves 254 and 255 do not restrict or prevent flow in a direction from the supply solenoid 230 to the intermediate right and left supply lines 238 and 248 respectively, air freely flows into these lines, and consequently inflates suspension elements 242 and 244. During this supply of air into the suspension elements, the dump solenoid remains closed. Therefore, air does not flow out of the system through exhaust line 221.

To dump air from the suspension elements, dump solenoid 220 is activated, and consequently air passes through the dump solenoid line 223, the dump solenoid 220, dump line 221 and out dump port 222. Because one-way valves 224 and 225 do not restrict flow in a direction from the intermediate left and right dump lines 236 and 246 to the solenoid dump line 223, air freely flows out through the dump port 222. During this dumping of air from the suspension elements, the supply solenoid 230 remains closed. Therefore, air does not flow into or out of the system through supply line 231.

Figure 14:
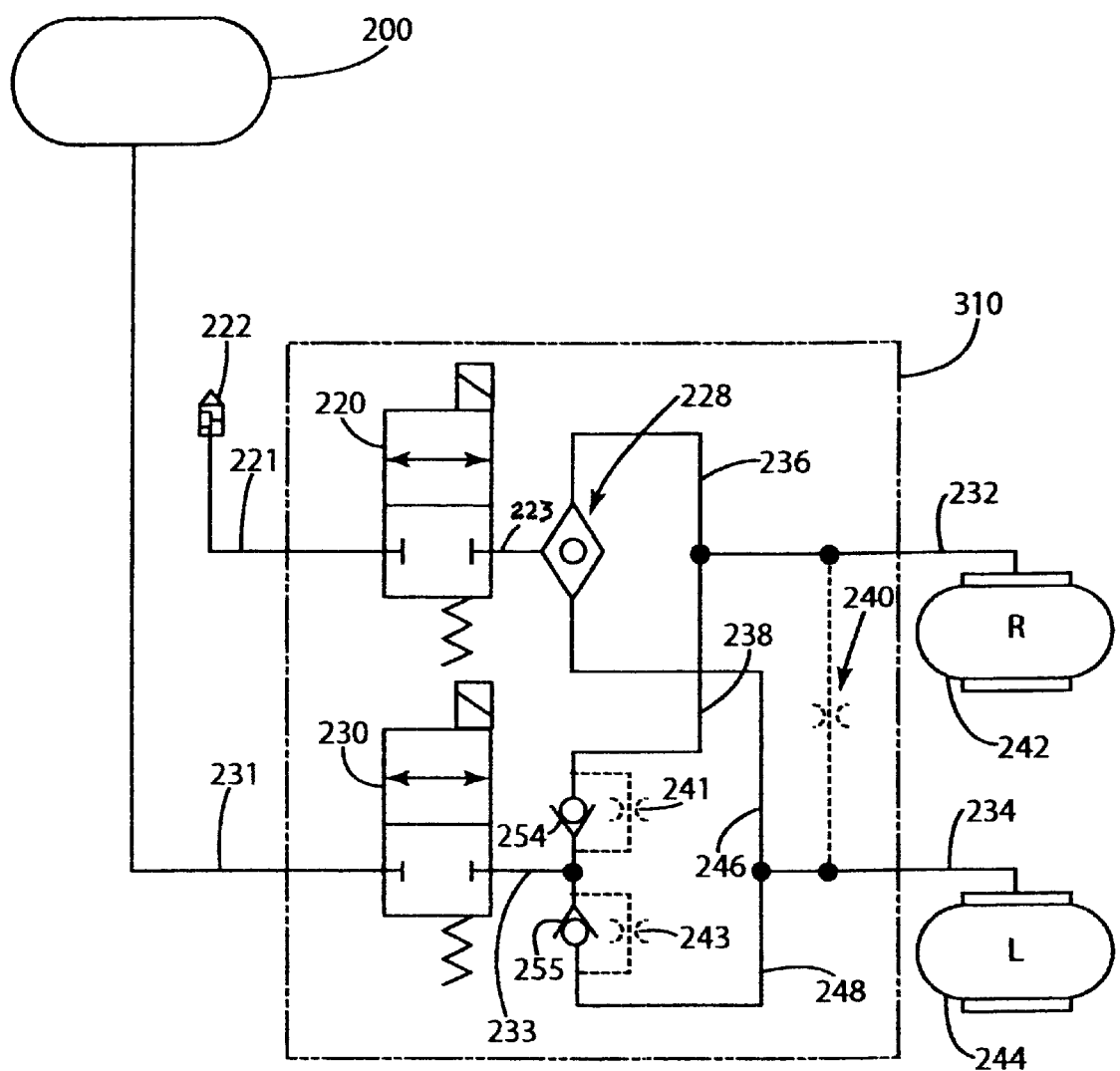
FIG. 14 is a schematic view of a third alternative embodiment of the leveling system incorporating a system of one-way valves and solenoids.

In the third alternative embodiment of the present invention, a valve system similar to the second embodiment is implemented. With reference to FIG. 14, the valve system 310 of the third embodiment has substantially all of the same elements as the second embodiment of FIG. 13, except the set of one-way valves associated with the intermediate left and right dump lines 236 and 246 is replaced by a shuttle valve as depicted. As will be appreciated, any valve may be substituted for the shuttle valve that prevents or restricts fluid communication between right intermediate dump line 236 and left intermediate dump line 246. Preferably, some sort of relief system such as orifice line 240 or supply-side orifice bypass lines 241 and 243 are implemented in this embodiment. As will be appreciated, the restriction of side-to-side transfer of air to/from suspension elements, the filling of suspension elements, and the dumping of suspension elements all operate in a manner similar to the operation described in reference to the second alternative embodiment and explained with reference to FIG. 13.

Figure 15:
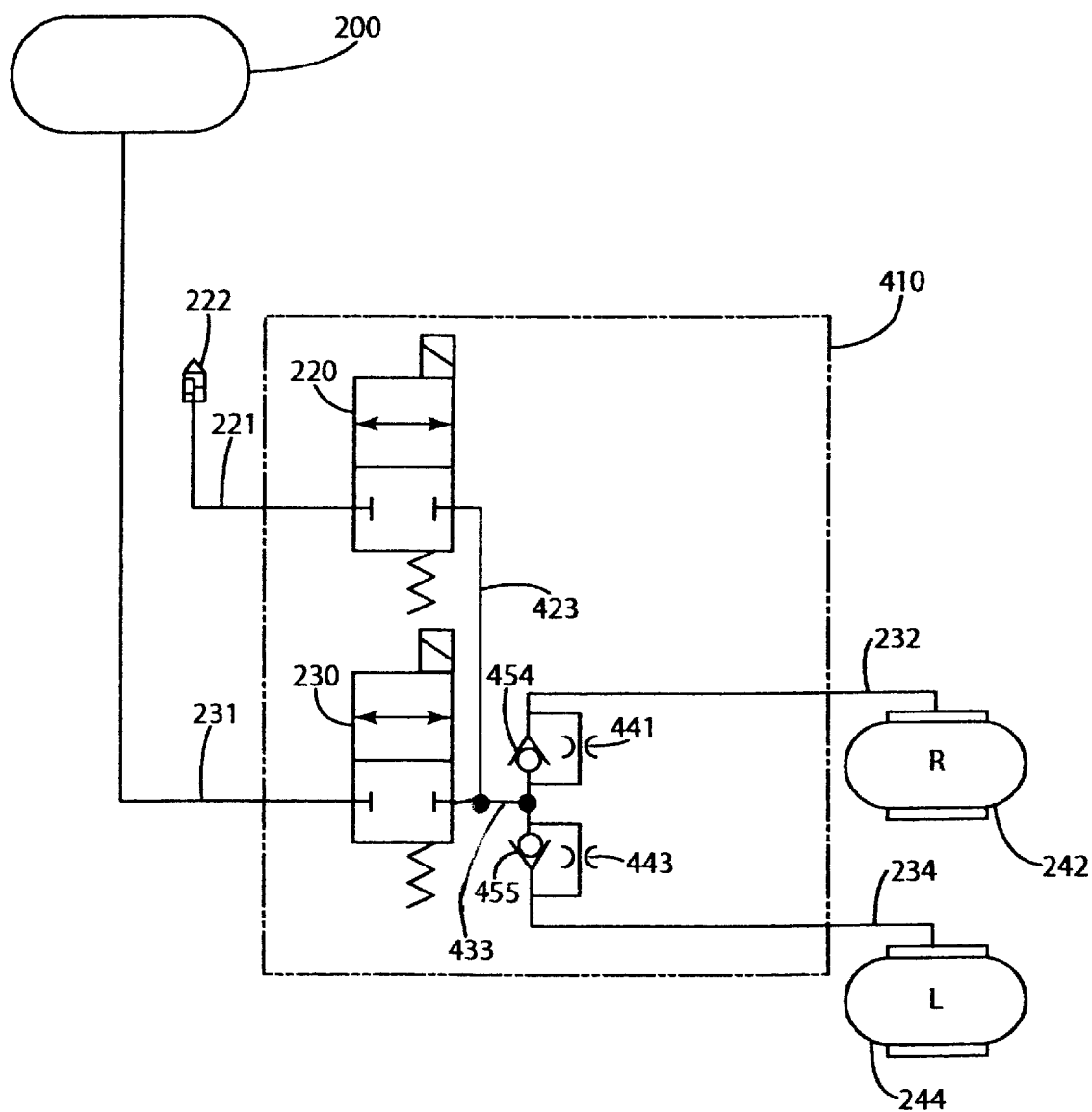
FIG. 15 is a schematic view of a fourth alternative embodiment of the leveling system incorporating a system of one-way valves and solenoids.

In the fourth alternative embodiment of the present invention, a valve system somewhat similar to the second embodiment is implemented. With reference to FIG. 15, the valve system 410 of the fourth alternative embodiment includes dump solenoid 220, related dump line 221 and supply solenoid 230, with related supply line 231, as in the valve system 210 of the second embodiment. But unlike the second embodiment, dump solenoid line 423 is in fluid communication with supply solenoid line 433. These lines are further in fluid communication with right suspension line 232 and left suspension line 234. Additionally, right suspension line 232 includes one-way valve 454, which preferably is a check valve, but may be any one-way valve that restricts or prevents flow in one direction and allows relatively free flow in an opposite direction. One-way valve 454 is oriented to allow air to flow unrestricted from right suspension line 232 to supply solenoid line 433 but restrict or prevent air from flowing from the solenoid supply line 433 into right suspension line 232. Similarly, left suspension line 234 includes one-way valve 455, which preferably is a check valve, but may be any one-way valve that restricts or prevents flow in one direction and allows relatively free flow in an opposite direction. One-way valve 455 is oriented to allow air to flow unrestricted from left suspension line 234 into supply solenoid line 433 but restrict or prevent air from flowing from solenoid supply line 433 into the left suspension line 234.

Right and left suspension lines preferably also include orifice bypass lines 441 and 443 to allow restricted fluid communication between intermediate right 232 and left 234 supply lines, and consequently fluid communication between suspension lines 232 and 234. However, these bypass orifice lines are somewhat larger than the orifice lines used in the second and third embodiments described above. Preferably, the orifice bypass lines have internal diameters of about 0.005 to about 0.4 inches, more preferably about 0.02 to about 0.1 inches, and most preferably about 0.050 inches. These bypass orifice lines are larger than the orifice lines of the previous embodiments because they are used also to fill the suspension elements with air and increase the ride height of the vehicle.

In operation, the fourth embodiment: (1) prevents completely unrestricted side-to-side air transfer in suspension elements of a vehicle, for example, from element 242 to element 244 or vice versa; (2) fills the suspension elements at a rate somewhat less than the rate of the previously described embodiments to increase ride height; and (3) rapidly dumps air from the suspension elements to lower ride height. Under normal conditions, when the suspension elements and are under equal loads, the system is static.

During cornering, for example, taking a hard left turn, right suspension element 242 would be subjected to a tremendous force, and would try to compensate by expelling air therefrom. With reference to FIG. 15, if suspension element 242 expels air into suspension line 232, that air travels unrestricted through one-way valve 454. Thereafter, the air cannot go through one-way valve 455 and enter left side suspension line 234, because that valve is forced closed to prevent air flow therethrough. The air does not flow through supply solenoid line 433 or dump solenoid line 423 because the solenoids 220 and 230 are not activated, and therefore prevent air from passing through them. However, air may optionally pass to the left side suspension element in a restricted flow through bypass orifice line 443.

Although bypass orifice line 443 substantially restricts flow, during extended periods when the right side suspension elements are excessively loaded relative to the left side elements, the air from those right side elements will slowly flow into the left side elements. But, for periods of brief, excessive, uneven loading, such as during cornering, typically encountered under normal driving conditions, this fourth embodiment adequately restricts side-to-side air transfer. Of course, the system would react in a similar manner under right cornering situations when the left side elements are excessively loaded.

To fill the suspension elements with air, supply solenoid 230 is activated, and consequently air passes from reservoir 200 and through supply line 433. From there, the air passes, in a restricted flow, through bypass orifice lines 441 and 443 into suspension lines 232 and 234 to ultimately fill right 232 and left 244 suspension elements. During this supply of air into the suspension elements, the dump solenoid remains closed. Therefore, air does not flow out of the system through exhaust line 221.

To dump air from the suspension elements, dump solenoid 220 is activated, and consequently air passes through the dump solenoid line 423, the dump solenoid 220, dump line 221 and out dump port 222. Because one-way valves 454 and 455 do not restrict flow in a direction from the suspension lines 232 and 234 respectively, air freely flows out through the dump port 222. During this dumping of air from the suspension elements, the supply solenoid 230 remains closed. Therefore, air does not flow into or out of the system through supply line 231.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. A system for restricting side-to-side air transfer between first and second suspension elements on opposite sides at least one of a vehicle and a trailer comprising:
   a first one-way valve, in fluid communication with the first suspension element and the second suspension element, oriented to allow fluid flow from the first suspension element and to prevent fluid flow from the second suspension element to the first suspension element;
   a second one-way valve, in fluid communication with the first suspension element and the second suspension element, oriented to allow fluid flow from the second suspension element and to prevent fluid flow from the first suspension element to the second suspension element; and
   a relief line in fluid communication with the first suspension element and the second suspension element, said relief line providing restricted fluid communication between the first and second suspension elements.

2. The system of claim 1 comprising means for deflating the first suspension element and the second suspension element in fluid communication with the first suspension element and the second suspension element, said deflating means actuatable between a first static mode and a deflating mode.

3. The system of claim 2 wherein said first one way-valve allows unrestricted fluid flow from the first suspension element when said deflating means is in said deflating mode whereby fluid is rapidly dumped from the first suspension element.

4. The system of claim 3 wherein said second one-way valve allows unrestricted fluid flow from the second suspension element when said deflating means is in said deflating mode whereby fluid is rapidly dumped from the second suspension element.

5. The system of claim 1 comprising means for inflating the first suspension element and the second suspension element in fluid communication with the first suspension element and the second suspension element, said inflating means actuatable between a second static mode and an inflating mode.

6. The system of claim 5 comprising a third one-way valve, in fluid communication with the first suspension element, oriented to allow fluid flow to the first suspension element from the inflating means and to prevent fluid flow from the first suspension element.

7. The system of claim 6 wherein said third one-way valve allows unrestricted fluid flow to the first suspension element from said inflating means when said inflating means is in said inflating mode whereby fluid is rapidly filled into the first suspension element.

8. The system of claim 7 comprising a fourth one-way valve, in fluid communication with the second suspension element, oriented to allow fluid flow to the second suspension element from the inflating means, and to prevent fluid flow from the second suspension element.

9. The system of claim 8 wherein said fourth one-way valve allows unrestricted fluid flow to the second suspension element from the inflating means when said inflating means is in said inflating mode whereby fluid is rapidly filled into the second suspension element.

10. The system of claim 9 wherein said first one-way valve is a check valve, said second one-way valve is a check valve, said third one-way valve is a check valve, and said fourth one-way valve is a check valve.

11. The system of claim 9 wherein said third one-way valve is a check valve, said fourth one-way valve is a check valve and said first one-way valve and said second one-way valve are included in a shuttle valve.

12. The system of claim 5 wherein said inflating means includes a inflating solenoid that attains said inflating mode when powered and attains said second static mode when not powered.

13. The system of claim 1 wherein said relief line includes a first bypass line that bypasses said first one-way valve and a second bypass line that bypasses said second one-way valve.

14. The system of claim 13 wherein said first bypass line and said second bypass line each include orifices that restrict airflow through said first bypass line and said second bypass line.

15. The system of claim 13 wherein said third bypass line and said fourth bypass line each include orifices that restrict airflow through said third bypass line and said fourth bypass line.

16. The system of claim 1 wherein said relief line includes a third bypass line that bypasses said third one-way valve and a fourth bypass line that bypasses said fourth one-way valve.

17. The system of claim 2 wherein said deflating means includes a deflating solenoid that attains said deflating mode when powered and attains said first static mode when not powered.

18. A suspension system for regulating transfer of air between suspension elements on opposite sides of at least one of a vehicle and a trailer, comprising:
   a first air spring for mounting on a first side of the at least one of a vehicle and a trailer including a first spring line;
   a second spring for mounting on a second side of the at least one of a vehicle and a trailer, opposite said first side, including a second spring line;
   supply means in fluid communication with said first spring line and said second spring line for filling with air said first air spring and said second air spring;
   dumping means in fluid communication with said first spring line and said second spring line for dumping air from said first air spring and said second air spring;
   a pneumatic circuit in fluid communication with said first spring line, said second spring line, said supply means and said dumping means including a plurality of one-way valves oriented to selectively allow air to be filled into said first air spring and said second air spring, but to selectively allow air to be dumped from said first air spring and said second air spring, but to prevent air from passing from said first air spring to said second air spring when the at least one of a vehicle and a trailer traverses a corner; and
   a relief line that provides restricted air transfer between the first and second air springs.

19. The system of claim 18 wherein said dumping means includes a dumping solenoid that operates at least one of a first activated mode wherein air is dumped from said first and second air springs and a first closed mode, wherein air cannot exit through said dumping means from said first and second air springs.

20. The system of claim 19 wherein said supply means includes a supply solenoid that operates in at least one of a second actuated mode wherein air is fed into said first and second air springs and a second closed mode, wherein air cannot exit through said supply means from said first and second air springs.

21. A suspension system for regulating transfer of air between suspension elements on opposite sides at least one of a vehicle and a trailer comprising:
   a first air spring on a first side of the at least one of a vehicle and a trailer including a first spring line;
   a second spring on a second side of the at least one of a vehicle and a trailer; opposite said first side, including a second spring line;
   supply means in fluid communication with said first spring line and said second spring line for filling with air said first air spring and said second air spring;
   dumping means in fluid communication with said first spring line and said second spring line for dumping air from said first air spring and said second air spring;
   a pneumatic circuit in fluid communication with said first spring line, said second spring line, said supply means and said dumping means including a plurality of one-way valves oriented to selectively allow air to be filled into said first air spring and said second air spring, to selectively allow air to be dumped from said first air spring and said second air spring, but to prevent air from passing from said first air spring to said second air spring when the at least one of a vehicle and a trailer traverses a corner; and
   at least one relief line that provides restricted fluid communication between said first and said second air springs to prevent at least one of said first and said second air springs from rupturing when said at least one of said first and said second air springs is loaded more than the other air spring and when said loaded at least one of said first and said second air springs will be damaged unless air is communicated therefrom to the other air spring.

22. A suspension system for at least one of a trailer and a vehicle comprising:
   a frame
   an axle separated from said frame a pre-selected distance that defines a ride height of the at least one of a vehicle and a trailer;
   a supply regulator that increases the ride height when said supply regulator is actuated;
   a dump regulator that decreases the ride height when said dump regulator is actuated;
   a first suspension element in fluid communication with said supply regulator and said dump regulator, said first suspension element mounted between said frame and said axle;
   a second suspension element in fluid communication with said supply regulator and said dump regulator, said second suspension element mounted between said frame and said axle; and
   a plurality of one-way valves in fluid communication with said supply regulator, said dump regulator, said first suspension element and said second suspension element, said plurality of one-way valves oriented to prevent air from transferring from said first suspension element to said second suspension element and vice versa wherein the at least one of a vehicle and a trailer is prevented from excessively tilting when said first suspension element and said second suspension element are unevenly loaded, said plurality of one-way valves configured to selectively allow the dump regulator to decrease the ride height when actuated, and to selectively allow the supply regulator to increase the ride height when actuated.

23. A pneumatic circuit for air springs for at least one of a trailer and a vehicle having a ride height comprising:
   a supply regulator for raising the ride height when said supply regulator is actuated;
   a dump regulator for lowering the ride height when said dump regulator is actuated;
   a first suspension element in fluid communication with said supply regulator and said dump regulator;
   a second suspension element in fluid communication with said supply regulator and said dump regulator;
   a plurality of one-way valves in fluid communication with said supply regulator, said dump regulator, said first suspension element and said second suspension element, and oriented to prevent air from transferring from said first suspension element to said second suspension element and vice versa, to selectively allow the dump regulator to lower the ride height when actuated, and to selectively allow the supply regulator to raise the ride height when actuated; and at least one relief line that provides restricted fluid communication between said first suspension element and said second suspension element.

24. The pneumatic circuit of claim 23 wherein said plurality of one-way valves includes a first one-way valve oriented to allow fluid flow from the first suspension element and to prevent fluid flow from the second suspension element to the first suspension element and a second one-way valve, in fluid communication with the first suspension element and the second suspension element, oriented to allow fluid flow from the second suspension element and to prevent fluid flow from the first suspension element to the second suspension element.

25. The pneumatic circuit of claim 24 wherein said plurality of one-way valves includes a third one-way valve, in fluid communication with the first suspension element, oriented to allow fluid flow to the first suspension element from the supply regulator and to prevent fluid flow from the first suspension element.

26. The pneumatic circuit of claim 25 wherein said third one-way valve allows unrestricted fluid flow to the first suspension element from said supply regulator when said ride height is raised.

27. The pneumatic circuit of claim 26 wherein said plurality of one-way valves includes a fourth one-way valve in fluid communication with the second suspension element, oriented to allow fluid flow to the second suspension element from the supply regulator and to prevent fluid from the second suspension element.

28. The pneumatic circuit of claim 27 wherein said fourth one-way valve allows unrestricted fluid flow to the first suspension element from said supply regulator when said ride height is raised.

* * * * *

UNITED STATES PATENT AND TRADEMARK OFFICE
CERTIFICATE OF CORRECTION

PATENT NO. : 6,669,217 B2
DATED : December 30, 2003
INVENTOR(S) : Sorum et al.

It is certified that error appears in the above-identified patent and that said Letters Patent is hereby corrected as shown below:

Column 13,
Line 33, after "spring," delete "but"

Signed and Sealed this

Twenty-seventh Day of April, 2004

JON W. DUDAS
*Acting Director of the United States Patent and Trademark Office*